United States Patent [19]
Ozeki et al.

[11] Patent Number: 5,628,253
[45] Date of Patent: May 13, 1997

[54] GROUND-PROPULSION SPECIAL-PURPOSE ELECTROMAGNETIC CIRCUIT FOR MAGNETICALLY LEVITATED RAILWAY, AND METHOD OF LAYING SAID CIRCUIT

[75] Inventors: Masanori Ozeki, Tokyo; Kazuo Sawada, Niiza, both of Japan

[73] Assignee: Railway Technical Research Institute, Japan

[21] Appl. No.: 616,050

[22] Filed: Mar. 14, 1996

Related U.S. Application Data

[63] Continuation-in-part of Ser. No. 214,150, Mar. 16, 1994, abandoned.

[30] Foreign Application Priority Data

Sep. 4, 1993 [JP] Japan ................. 5-082263

[51] Int. Cl.⁶ ......................................... B60L 13/00
[52] U.S. Cl. .................. 104/292; 104/281; 104/286; 104/294
[58] Field of Search ................... 104/281, 282, 104/286, 290, 292, 294; 310/12, 13

[56] References Cited

U.S. PATENT DOCUMENTS

| | | | |
|---|---|---|---|
| 3,621,311 | 11/1971 | Von Starck | 310/13 |
| 3,791,309 | 2/1974 | Baermann | 104/286 |
| 3,850,109 | 11/1974 | Thornton | 104/286 |
| 3,942,050 | 3/1976 | Oberretl | 310/13 |
| 4,303,017 | 12/1981 | Dull | 104/294 |
| 4,913,059 | 4/1990 | Fujie et al. | 104/282 |
| 5,178,072 | 1/1993 | Suzuki | 104/286 |
| 5,189,961 | 3/1993 | Fujie | 104/281 |
| 5,450,050 | 9/1995 | Ban et al. | 104/286 |

FOREIGN PATENT DOCUMENTS

| | | | |
|---|---|---|---|
| 1120182 | 12/1961 | Germany | 310/13 |
| 288356 | 3/1990 | Japan | 104/286 |
| 431163 | 2/1992 | Japan | 104/286 |
| 4189902 | 7/1992 | Japan | 104/286 |
| 333675 | 12/1968 | Switzerland | 310/13 |

OTHER PUBLICATIONS

IEEE Transactions on Magnetics vol. Mag–13, No. 5, Sep. 1977.

Thyssen Henschel pamphlet titled "Magnetic Levitation Technology—Super Speed Maglev System Transrapid" pp. 4, 5.

*Primary Examiner*—Mark T. Le
*Attorney, Agent, or Firm*—Lorusso & Loud

[57] ABSTRACT

In a ground-propulsion special-purpose electromagnetic circuit for a magnetically levitated railway in which a vehicle is propelled by acting upon superconducting magnets mounted on the vehicle, there are provided beam panels placed on both side walls of a guideway, vertically extending grooves formed in each of the beam panels at a prescribed pitch, and plural-phase cables fitted in the grooves. Levitation-guidance coil molding bodies are attached so as to cover the secured plural-phase cables.

4 Claims, 11 Drawing Sheets

A~A    B~B

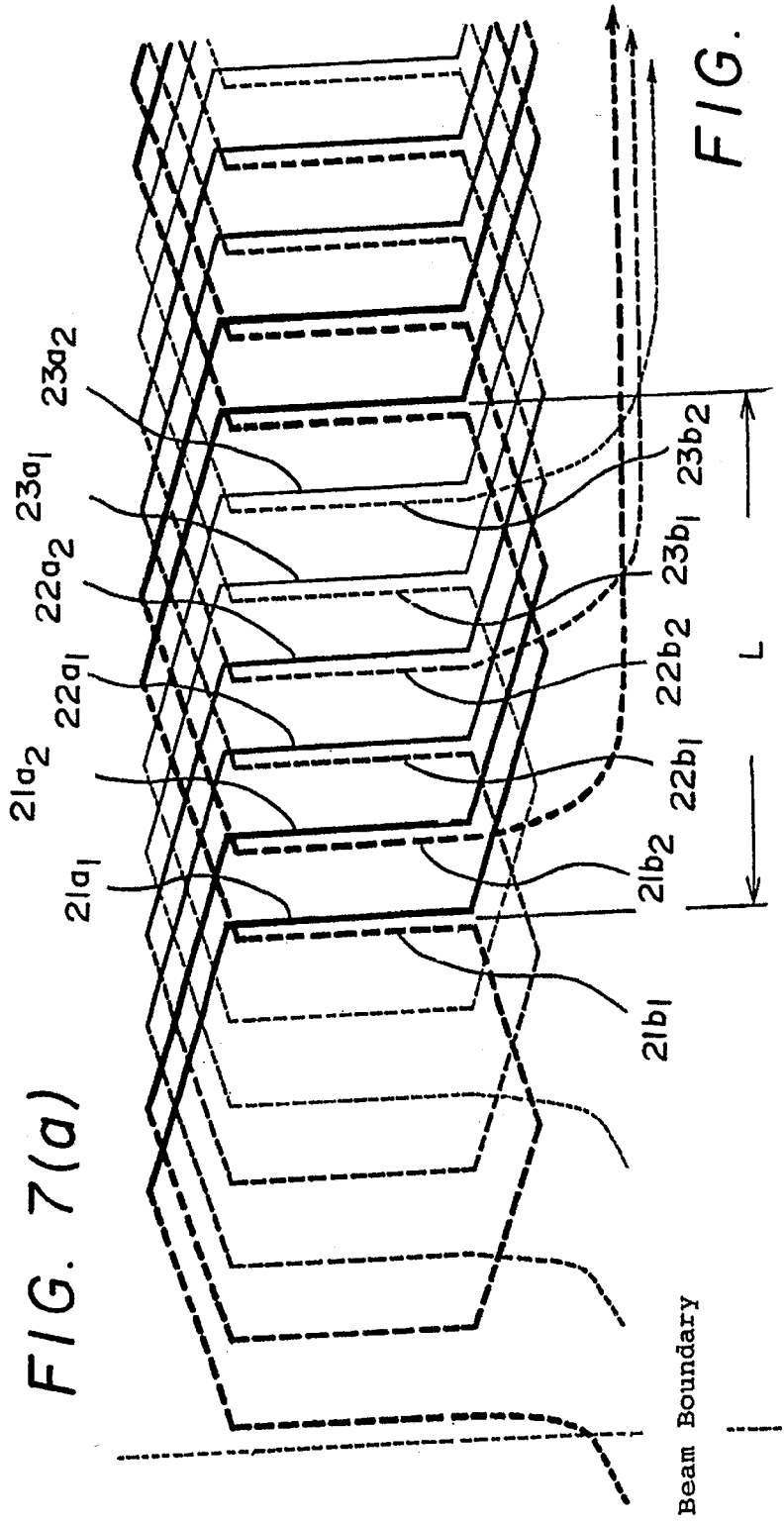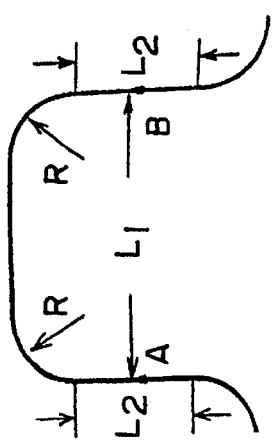

GROUND-PROPULSION SPECIAL-PURPOSE ELECTROMAGNETIC CIRCUIT FOR MAGNETICALLY LEVITATED RAILWAY, AND METHOD OF LAYING SAID CIRCUIT

This application is a continuation-in-part of application Ser. No. 08/214150, field Mar. 16, 1994, now abandoned.

BACKGROUND OF THE INVENTION

This invention relates to ground coils for a magnetically levitated railway and, more particularly, to a ground-propulsion special-purpose electromagnetic circuit secured to the side walls of a guideway.

An example of the prior art in the technical field to which the present invention appertains will now be described.

As shown in FIG. 2, four unit coils 1~4 for levitation and guidance are arranged in an identical cross section in the traveling direction of a vehicle. The coils 1~4 are connected by null-flux connectors 5 for levitation in such a manner that voltages generated by magnetic flux interlinking with the upper and lower coils when the vehicle passes by cancel each other out, thereby producing a levitating force. Furthermore, null-flux connecting lines 6 and 7 for guidance are provided in such a manner that induced voltages generated by flux interlinking with mutually opposing unit coils, namely coils 1 and 3 and coils 2 and 4, will cancel each other.

A special-purpose coil 9 exclusively for propulsion is supplied with electric power from an external power supply 8. The coil 9, which is placed entirely independently of the above-mentioned coils for levitation and guidance, is so arranged as to propel the vehicle in cooperation with superconducting magnets (superconducting coils, which are not shown) mounted on the vehicle.

This system has already been disclosed by the applicant in U.S. Pat. No. 4,913,059.

As shown in FIG. 1, a plurality of the special-purpose coils 9 for propulsion branch from feeder lines U, V, W and are serially connected to phases U, V, W, respectively, via a switch SW. Further, the U, V and W phases are interconnected in a terminating unit TM and connected to a neutral line N. In other words, the phases are Y-connected to construct one section.

In FIGS. 3 and 4, a ground-coil fixing panel 11 is provided on a side wall 10 of a guideway. A first propulsion coil 12 having a lead-wire terminal 13 for connecting coils, a second propulsion coil 14 having a lead-wire terminal 15 for connecting coils and a levitation-guidance coil 16 molded from resin are mounted on the ground-coil fixing panel 11.

As shown in FIG. 4, the ground coils for the magnetically levitated railway according to the prior art described above are such that the independently wound first propulsion coil 12 having the lead-wire terminal 13 for connecting coils and the second propulsion coil 14 having the lead-wire terminal 15 for connecting coils are placed to correspond to each of the levitation-guidance coils. Since a high voltage is impressed upon the propulsion coils 12, 14, the terminals are costly and difficulty is encountered in terms of reliability.

The number of turns in a propulsion coil is decided by the number of cars of the vehicle connected together, the required acceleration, etc. The smaller the overall length of the interconnected cars, that is, the smaller the number of superconducting magnets, and the higher the acceleration, the greater the number of turns. In the case of the Miyazaki Test Track, the overall length of the interconnected cars is small and therefore the propulsion coils have 32 turns. In the case of the Yamanashi Test Line, the overall length of the interconnected cars is greater than that of the Miyazaki Test Track and therefore the propulsion coils have seven to ten turns. Since the overall length in future commercial lines for high-volume transportation will naturally be great, it is predicted that the number of turns will be small.

Accordingly, an object of the present invention is to adopt a system in which, rather than relying upon the individual propulsion coils of the prior art, cables are wound on side walls of a guideway in wave-like fashion to form electromagnetic winding, whereby one turn of a coil is arranged so as to correspond to one cable (i.e., one vertical side thereof).

Thus, an object of the invention is to provide a ground-propulsion special-purpose electromagnetic circuit for a magnetically levitated railway, as well as a method of laying the circuit, in which the number of lead-wire terminals of the propulsion coils can be greatly reduced, cost lowered and reliability improved.

SUMMARY OF THE INVENTION

In order to attain the foregoing objects, the present invention is characterized by the following:

(A) In a ground-propulsion special-purpose electromagnetic circuit for a magnetically levitated railway in which a vehicle is propelled by acting upon superconducting magnets mounted on the vehicle, there are provided beam panels placed on both side walls of a guideway, vertically extending grooves formed in each of the beam panels at a prescribed pitch, plural-phase cables fitted in the grooves, and a levitation-guidance coil molding body covering the secured plural-phase cables.

The plural-phase cables construct a unit beam panel comprising outgoing cables secured in the grooves sequentially in wave-like fashion, and incoming cables turned back at a prescribed distance and wound in reverse in wave-like fashion to form a plurality of sections or magnetic poles, and the unit beam panels are connected in series to construct a feed section.

Furthermore, the outgoing cables and incoming cables through which currents pass in an identical phase and identical direction are fitted in the grooves.

Further, the outgoing cables and incoming cables through which currents pass in an identical phase and identical direction are fitted in mutually adjacent ones of the grooves to form a plurality of turns of identical phase.

Furthermore, the unit beam panel comprises a concrete panel in the surface of which the vertically extending grooves are formed through the intermediary of a spacer.

The spacer comprises FRP.

Furthermore, the FRP contains a magnetic powder. Additionally or alternatively, the concrete of the concrete panel contains a magnetic powder.

(B) In a method of laying a ground-propulsion special-purpose electromagnetic circuit for a magnetically levitated railway in which a vehicle is propelled by acting upon superconducting magnets mounted on the vehicle, vertically extending grooves are formed at a prescribed pitch in beam panels placed on both side walls of a guideway, and plural-phase cables are fitted in the grooves, wherein each unit beam panel is constructed by fitting outgoing cables in the grooves in wave-like fashion, turning back the outgoing cables and rewinding incoming cables in reverse in wave-like fashion, and a feed section is constructed by serially connecting the unit beam panels.

Further, one end loops of the cables of each beam panel overlap an adjoining section of an adjacent beam panel.

Furthermore, the unit beam panels are interconnected by connecting their cables at an identical location.

In accordance with the present invention, a ground-propulsion special-purpose electromagnetic circuit for a magnetically levitated railway in which a vehicle is propelled by acting upon superconducting magnets mounted on the vehicle is provided with a beam panel arranged on both side walls of a guideway, vertically extending grooves formed in the beam panel at a prescribed pitch, plural-phase cables fitted in the grooves, and a levitation-guidance coil molding body covering the plural-phase cables fitted in the grooves. As a result, the number of lead-wire terminals of the propulsion coils can be greatly reduced, cost lowered and reliability improved.

Further, by making end loops of the cables overlap an adjoining beam panel, care is taken so that the end portion of the unit beam panel will not have winding conditions different from those at the intermediate portion of the unit beam panel. This makes it possible to mitigate pulsation of electromagnetic force.

Furthermore, by providing the cables at the end portion of the beam panel with a connecting portion, a ground-propulsion special-purpose electromagnetic circuit for a magnetically levitated railway can be laid in a simple manner merely by connecting both ends of the unit beam panels by connectors. In addition, manufacture of the unit beam panel itself is facilitated.

BRIEF DESCRIPTION OF THE DRAWINGS

FIG. 7(a) is a structural view showing cables at the starting edge portion of a unit beam panel in the ground-propulsion special-purpose electromagnetic circuit for the magnetically levitated railway illustrating the first embodiment of the present invention;

FIG. 7(b) is a diagram illustrating an example of the dimensions of a cable per one phase in a unit beam panel;

DESCRIPTION OF THE PREFERRED EMBODIMENTS

Embodiments of the present invention will now be described in detail with reference to the drawings.

Figure 1:
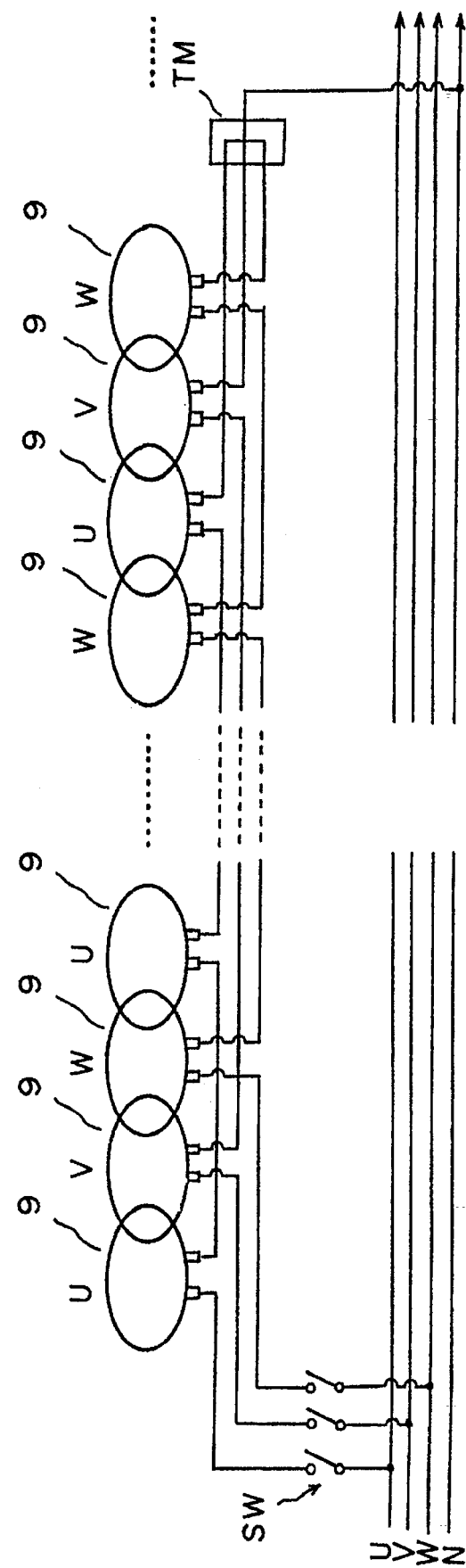
FIG. 1 is a diagram illustrating the wiring of propulsion coils in ground coils for a magnetically levitated railway according to the prior art.
Figure 2:
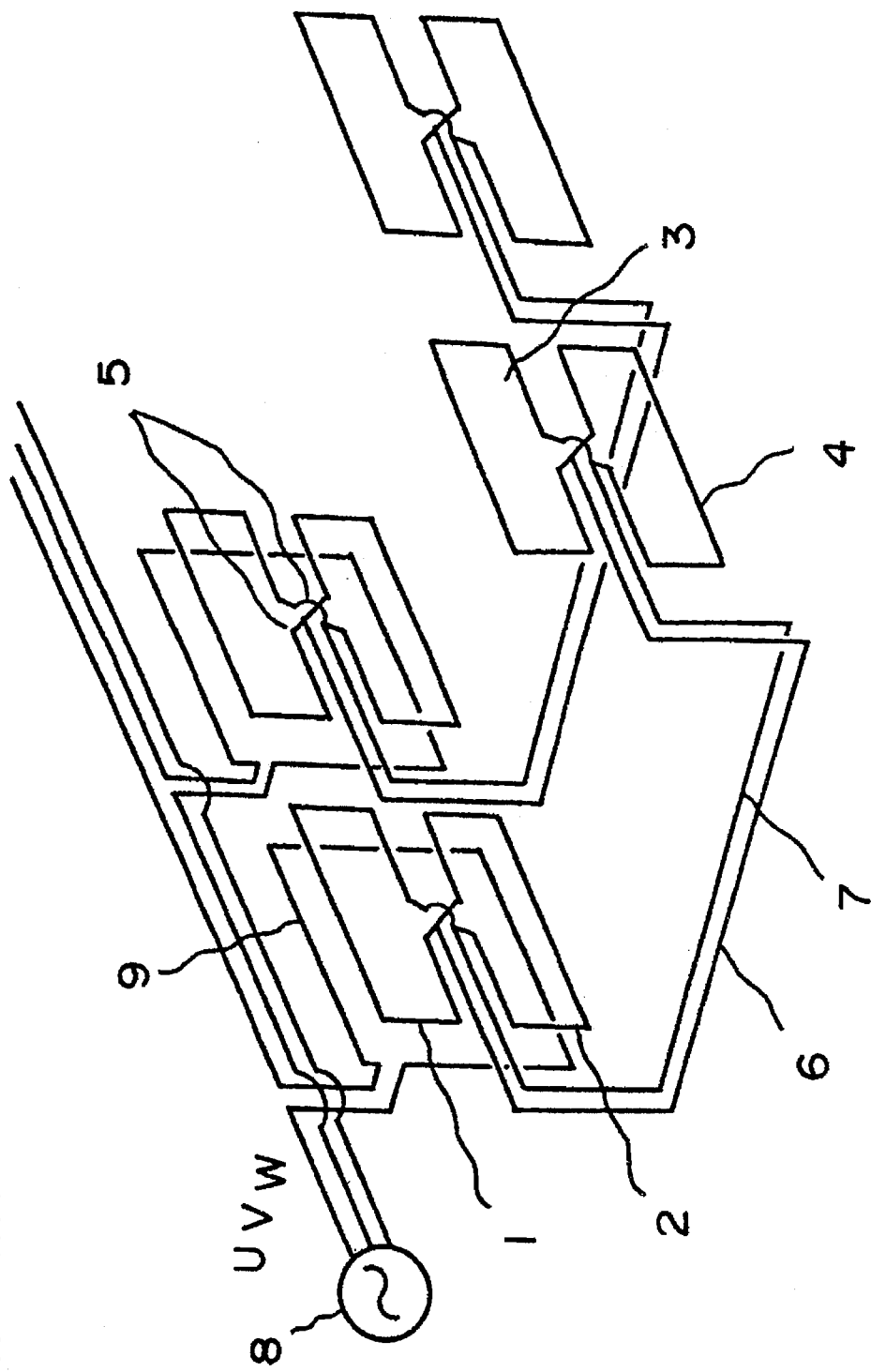
FIG. 2 is a schematic view illustrating the connections and method of placing ground coils for a magnetically levitated railway according to the prior art.
Figure 3:
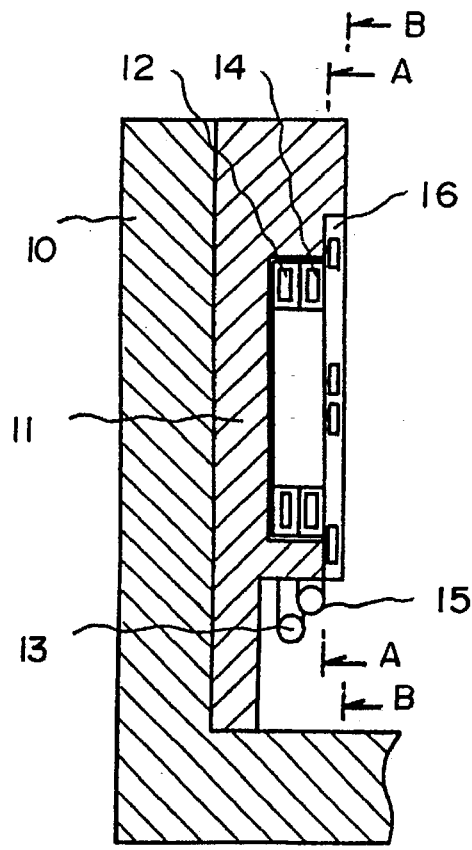
FIG. 3 is a sectional view illustrating the placement of ground coils for a magnetically levitated railway according to the prior art.
Figure 4:
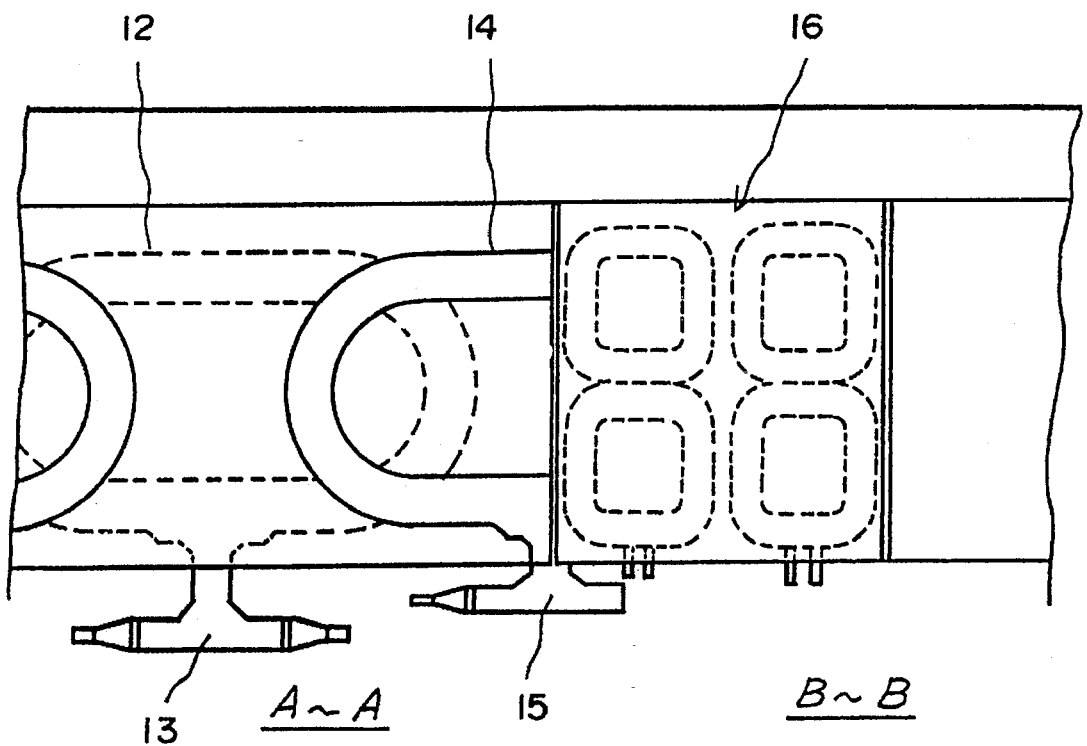
FIG. 4 is a partially cut away front view of the ground coils for a magnetically levitated railway according to the prior art.
Figure 5:
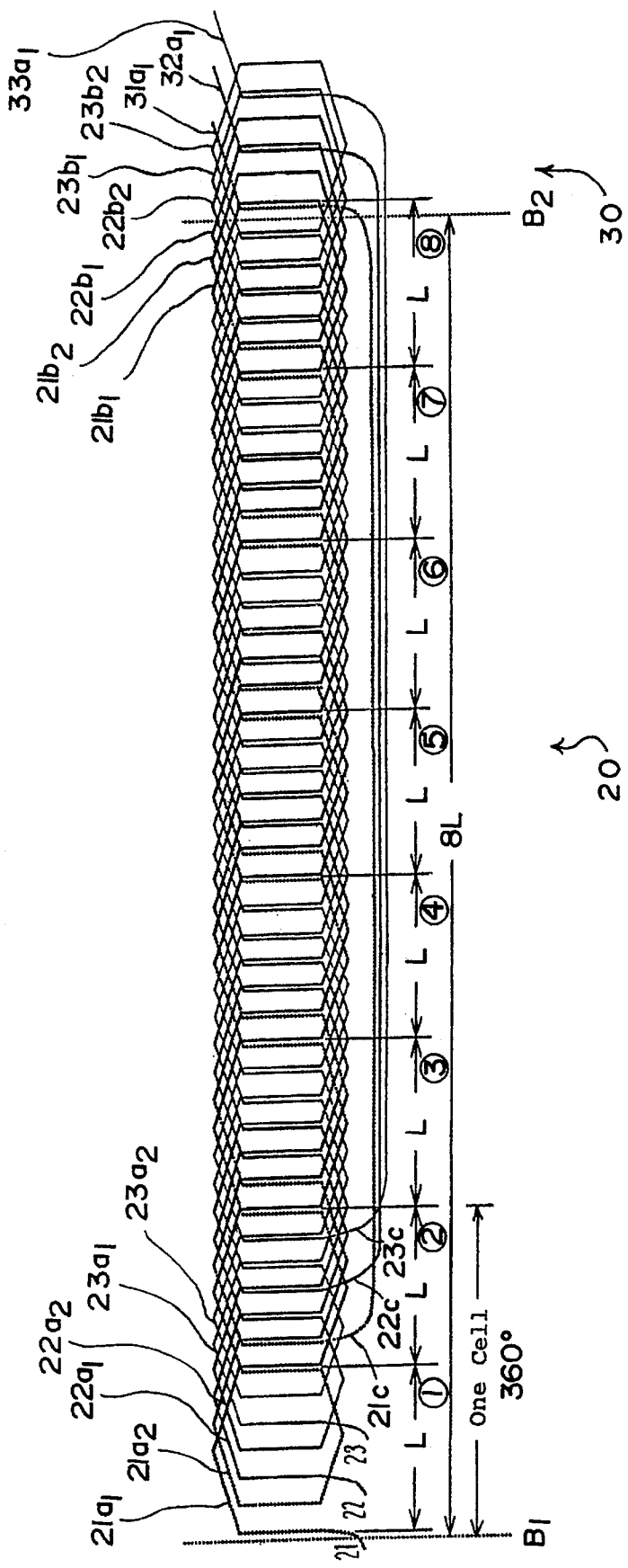
FIG. 5 is an overall structural view showing a unit beam panel of a ground-propulsion special-purpose electromagnetic circuit for a magnetically levitated railway illustrating a first embodiment of the present invention.
Figure 6:
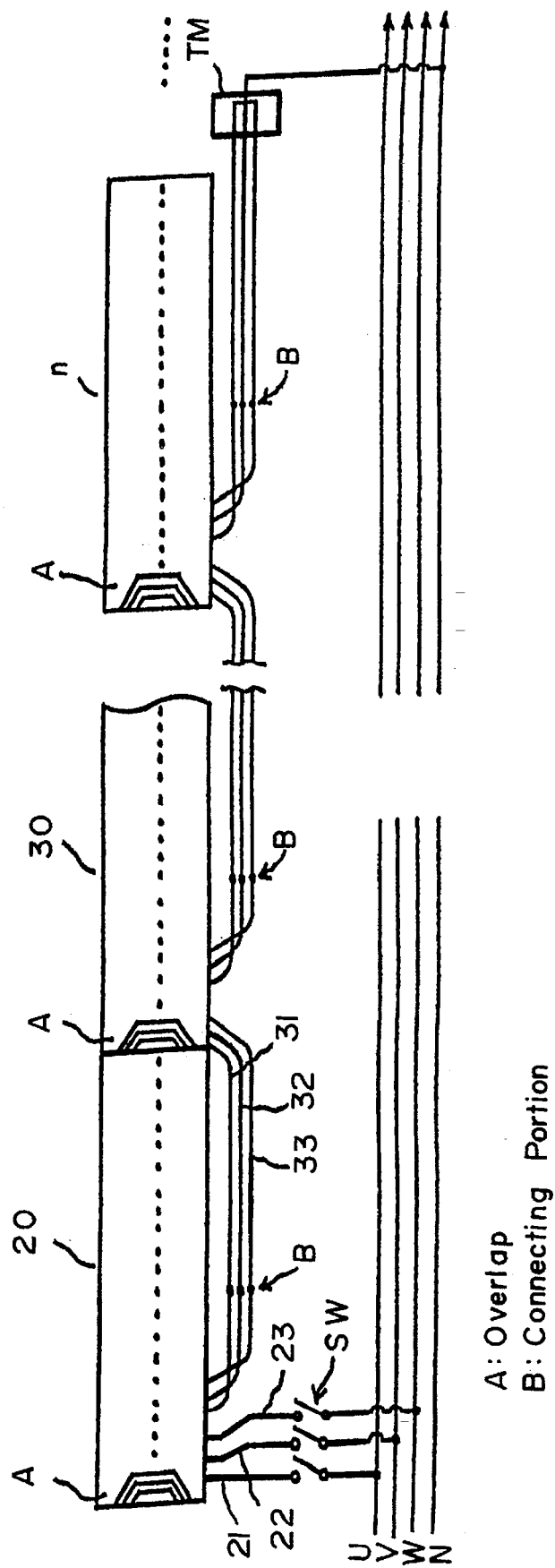
FIG. 6 is a schematic overall structural view showing the ground-propulsion special-purpose electromagnetic circuit on one side of a guideway for the magnetically levitated railway illustrating the first embodiment of the present invention.
Figure 8:
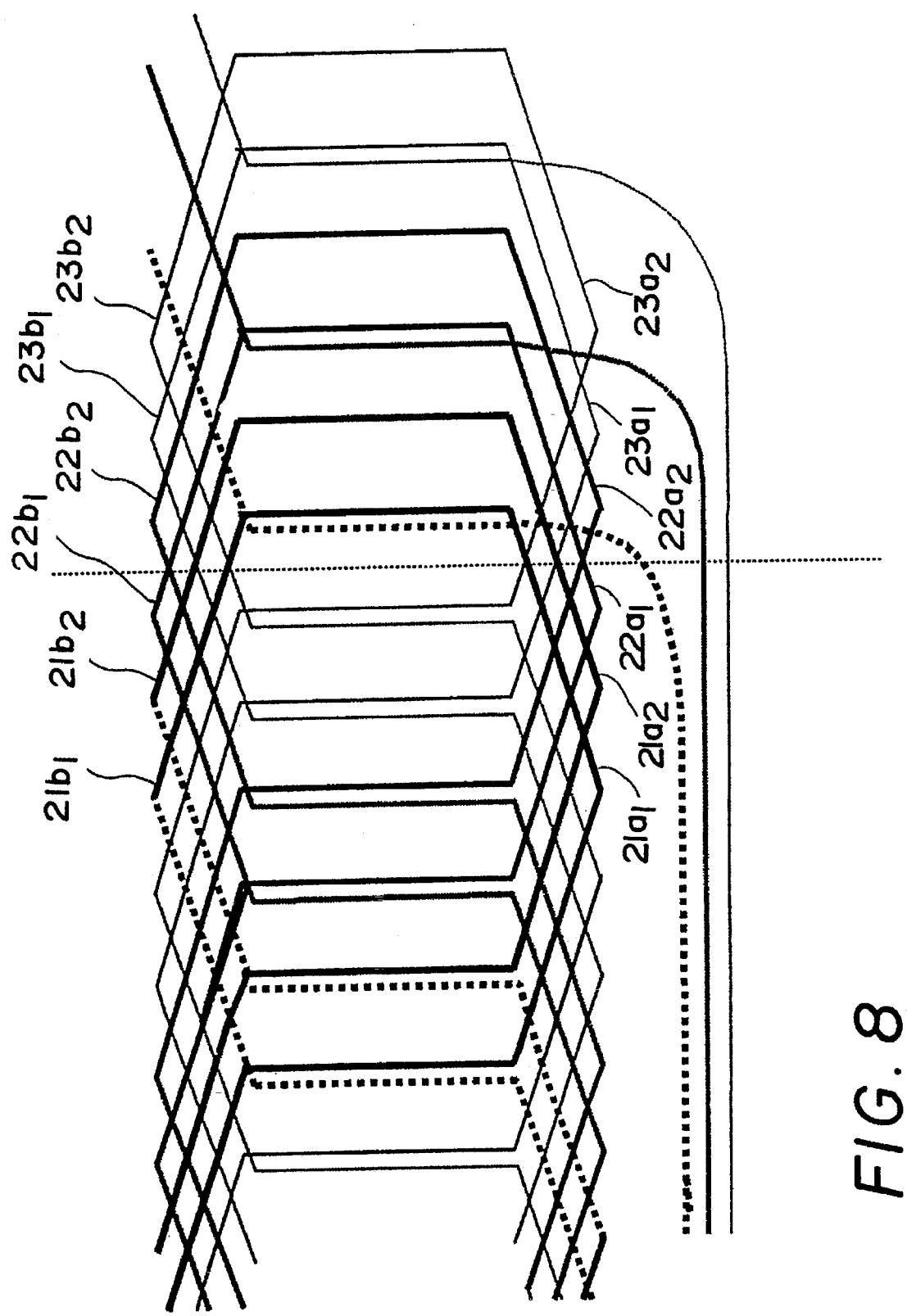
FIG. 8 is a structural view showing cables at a boundary portion between adjoining beam panels in the ground-propulsion special-purpose electromagnetic circuit for the magnetically levitated railway illustrating the first embodiment of the present invention.
Figure 9:
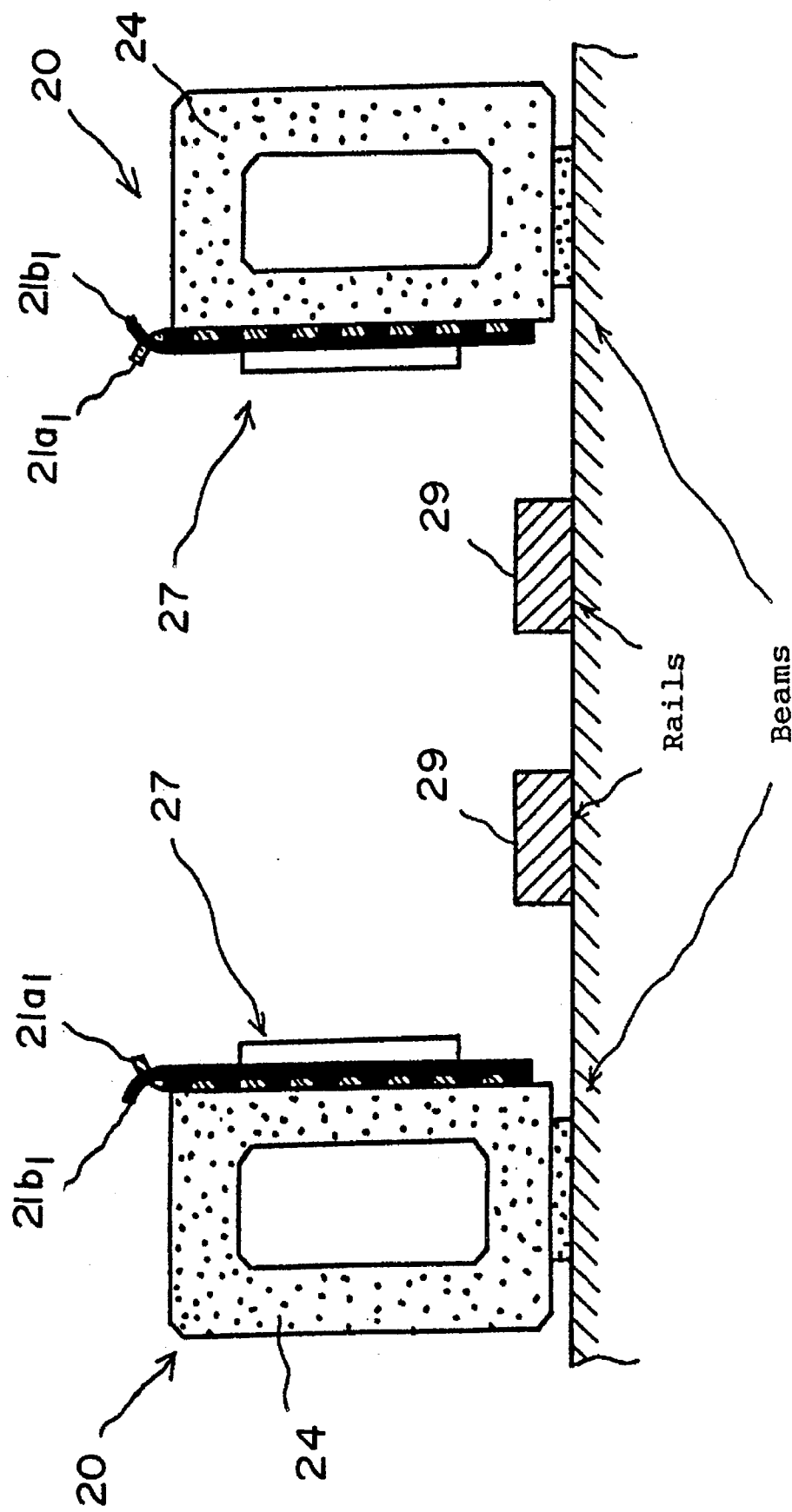
FIG. 9 is a sectional view showing the ground-propulsion special-purpose electromagnetic circuit for the magnetically levitated railway illustrating the first embodiment of the present invention.
Figure 10:
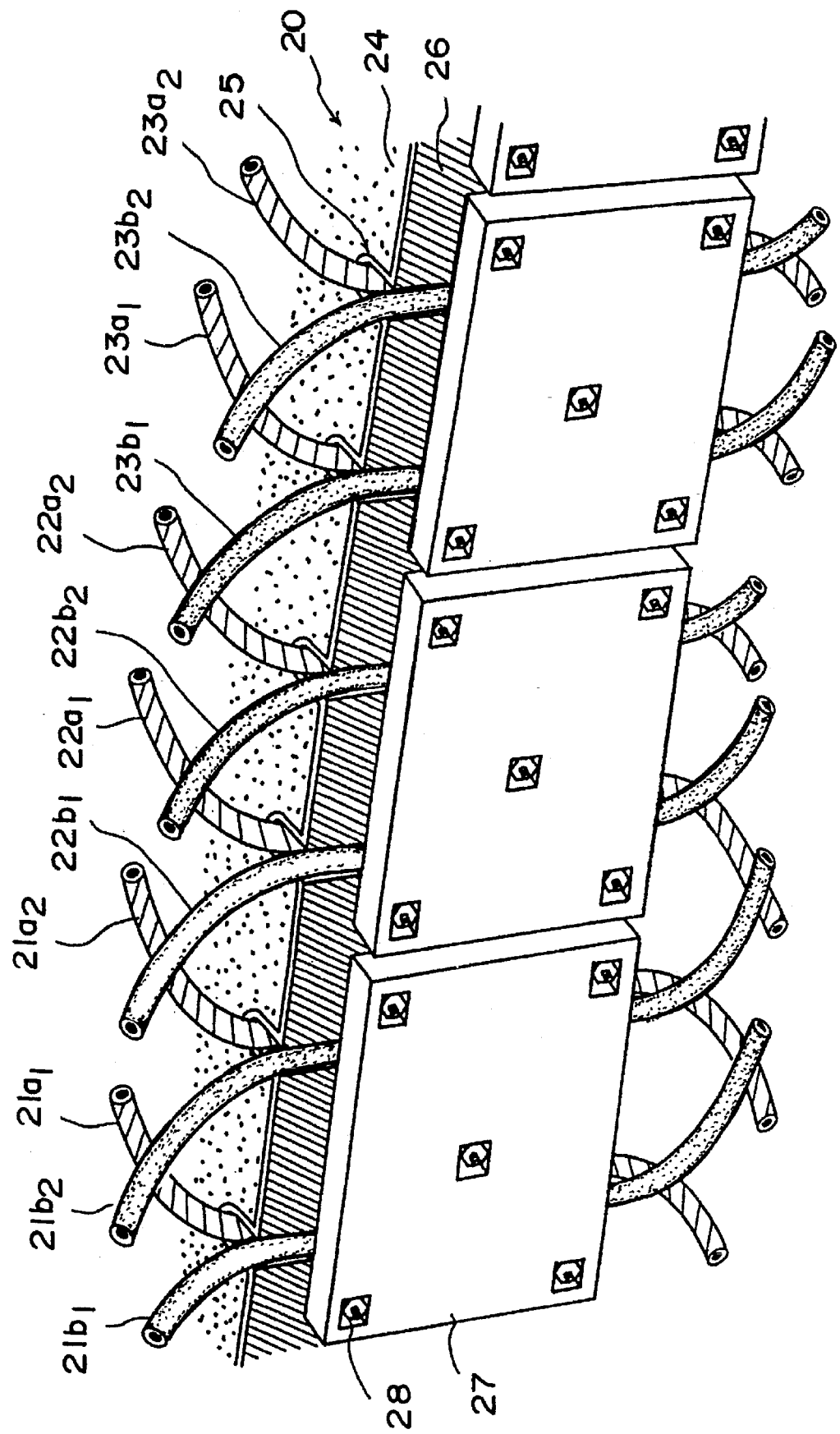
FIG. 10 is a partial perspective view showing unit beam panels in the ground-propulsion special-purpose electromagnetic circuit for the magnetically levitated railway illustrating the first embodiment of the present invention.

FIG. 5 is an overall structural view showing a unit beam panel of a ground-propulsion special-purpose electromagnetic circuit for a magnetically levitated railway illustrating a first embodiment of the present invention, and FIG. 6 is a schematic overall structural view showing the ground-propulsion special-purpose electromagnetic circuit for this magnetically levitated railway. FIG. 7(a) and FIG. 8 are partially enlarged views respectively illustrating the starting edge portion and boundary portion of a unit beam panel in the ground-propulsion special-purpose electromagnetic circuit for the magnetically levitated railway. Further, $B_1$ and $B_2$, FIG. 5, indicate boundary portions. Cables in FIG. 5, FIG. 7(a), FIG. 8 and FIG. 11 are such that two cables are fitted into the same groove, as illustrated in FIGS. 9 and 10, in which case the dashed-line portions of the cables are fitted into the bottom side of the groove and the solid-line portions of the cables are fitted into the top side of the groove.

As shown in FIG. 5, a horizontally elongated unit beam 20 of a ground-propulsion special-purpose electromagnetic circuit for a magnetically levitated railway according to this embodiment has a cable winding portion consisting of eight magnetic poles or subsections ①-⑧), by way of example.

A method of winding cables as an electromagnetic circuit according to this invention will now be described in detail.

First, starting from the first subsection ① of the unit beam panel 20, a cable 21 connected to the U phase of a power supply is fitted in a first groove, from the lower to the upper part thereof, formed vertically in the unit beam panel 20 (described below), and then in a seventh groove from the upper part to the lower part thereof. Thereafter, the cable is wound as a first outgoing cable $21a_1$ successively up and down rightward in wave-like fashion at the same pitch. When the cable reaches a first groove of the first subsection of a unit beam panel 30 adjacent to the unit beam panel 20, it is fitted in the first groove from the lower to the upper part thereof, at which point the cable is looped or turned back to become a first incoming cable $21b_1$. This cable is returned to the unit beam panel 20 and is rewound successively up and down leftward in wave-like fashion at the same pitch as that of the outgoing path so as to be directed toward the starting end of the unit beam panel 20.

The cable is then fitted in a groove, from the lower part to the upper part thereof, that is one groove to the right of the groove accommodating the outgoing cable $21a_1$ of the starting end of the unit beam panel 20, and the cable is looped or turned back again and fitted in successively rightward in wave-like fashion, at a pitch the same as that mentioned above, as a second outgoing cable $21a_2$. When the cable reaches a second groove of the first subsection of the adjacent unit beam panel 30, it is fitted in the second groove from the lower to the upper part thereof, at which point the cable is looped or turned back to become a second incoming cable $21b_2$. This cable is returned to the unit beam panel 20 and is rewound successively up and down leftward in wave-like fashion at the same pitch as that of the outgoing path so as to be directed toward the starting end of the unit beam panel 20.

When the cable reaches the second groove (the eighth groove in terms of consecutive numbers) of the second subsection ② of the unit beam panel 20, the cable is fitted in this groove from the upper to the lower part thereof and is led out as a connecting cable 21c. This cable is then introduced into the first groove, from the lower to the upper part thereof, of the first subsection of the adjacent unit beam panel 30 and is wound as a first outgoing cable $31a_1$.

Next, a cable 22 is connected to the V phase of the power supply and is fitted in a third groove, from the lower to the upper part thereof, formed vertically in the unit beam panel 20. Next, the cable is fitted in a ninth groove from the upper part to the lower part thereof. Thereafter, the cable is wound as a first outgoing cable $22a_1$ successively up and down rightward in wave-like fashion at the same pitch. When the cable reaches a third groove of the first subsection of the unit beam panel 30 adjacent to the unit beam panel 20, it is fitted in the third groove from the lower to the upper part thereof, at which point the cable is looped or turned back to become a first incoming cable $22b_1$. This cable is returned to the unit beam panel 20 and is rewound successively up and down leftward in wave-like fashion at the same pitch as that of the outgoing path so as to be directed toward the starting end of the unit beam panel 20. When the cable reaches the starting end of the unit beam panel 20, namely a fourth groove of the unit beam panel 20, the cable is fitted in the fourth groove from the lower to the upper part thereof and is looped or turned back again and fitted in at the same pitch and in wave-like fashion as a second outgoing cable $22a_2$. When the cable reaches a fourth groove of the first subsection of the adjacent unit beam panel 30, it is wound in the fourth groove from the lower to the upper part thereof, at which point the cable is looped or turned back to become a second incoming cable $22b_2$. This cable is returned to the unit beam panel 20 and is rewound successively up and down leftward in wave-like fashion at the same pitch as that of the outgoing path so as to be directed toward the starting end of the unit beam panel 20. When the cable reaches the fourth groove (the tenth groove in terms of consecutive numbers) of the second subsection ② of the unit beam panel 20, the cable is fitted in this groove from the upper to the lower part thereof and is led out as a connecting cable 22c. This cable is then introduced into the third groove, from the lower to the upper part thereof, of the first subsection of the adjacent unit beam panel 30 and is wound as a first outgoing cable $32a_1$.

Finally, a cable 23 is connected to the W phase of the power supply and is fitted in a fifth groove, from the lower to the upper part thereof, formed vertically in the unit beam panel 20. Next, the cable is fitted in an 11th groove from the upper part to the lower part thereof. Thereafter, the cable is wound as a first outgoing cable $23a_1$ successively up and down rightward in wave-like fashion at the same pitch. When the cable reaches a fifth groove of the first subsection of the unit beam panel 30 adjacent to the unit beam panel 20, it is fitted in the fifth groove from the lower to the upper part thereof, at which point the cable is looped or turned back to become a first incoming cable $23b_1$. This cable is returned to the unit beam panel 20 and is rewound successively up and down leftward in wave-like fashion at the same pitch as that of the outgoing path so as to be directed toward the starting end of the unit beam panel 20. When the cable reaches a sixth groove of the unit beam panel 20, the cable is fitted in the sixth groove from the lower to the upper part thereof and is looped or turned back again and fitted in at the same pitch and in wave-like fashion as a second outgoing cable $23a_2$. When the cable reaches a sixth groove of the first subsection of the adjacent unit beam panel 30, it is fitted in the sixth groove from the lower to the upper part thereof, at which point the cable is looped or turned back to become a second incoming cable $23b_2$. This cable is returned to the unit beam panel 20 and is rewound successively up and down leftward in wave-like fashion at the same pitch as that of the outgoing path so as to be directed toward the starting end of the unit beam panel 20. When the cable reaches the sixth groove (the 12th groove in terms of consecutive numbers) of the second subsection ② of the unit beam panel 20, the cable is fitted in this groove from the upper to the lower part thereof and is led out as a connecting cable 23c. This cable is then introduced into the fifth groove, from the lower to the upper part thereof, of the first subsection of the adjacent unit beam panel 30 and is wound as a first outgoing cable $33a_1$.

Thus, according to this embodiment, the arrangement is such that there are four pairs of magnetic poles per beam panel, and loops of the cables at one end are made to overlap the adjoining section or pole of the adjacent beam panel.

In FIG. 6, A represents the overlapping portion and B represents a connecting portion.

In a case where the cables are made to overlap, the cables at the end portion of one beam panel are inserted only in the lower layer of a slot and the beam panel is brought to the site and installed. The cables from the adjacent beam panel are then fitted in the upper layer of the slot and a guidance-levitation coil molding body is attached.

The reason for adopting this arrangement is that pulsation of electromagnetic force will be produced unless the end portion of the winding is arranged in such a manner that the electrical characteristics will be identical with those of the central portion of the unit beam panel.

Accordingly, by making the cables overlap one side of the adjacent unit beam panel, as set forth above, care is taken so that the end portion of the unit beam panel will not have winding conditions different from those at the intermediate portion of the unit beam panel. This makes it possible to mitigate pulsation of electromagnetic force.

Further, superconducting magnets 42, 43 correspond to a double subsection, e.g., subsections 2 and 3, to construct one cell and define an electric angle of 360°.

By way of example, the length L of a subsection is 1.35 m, and the length 8 L of the unit beam panel is 10.8 m. The unit beam panel is formed to have 48 grooves in the vertical direction and at a prescribed pitch, and plural phases of the above-mentioned cables are fitted in the grooves.

The specific placement of the cables will now be described with reference to FIGS. 7(a) through 10.

As shown in FIG. 9, rails 29 are laid along the central portion of a guideway and unit beam panels 20, each of which includes a side-wall concrete panel 24, are arranged on both side walls of the guideway. As illustrated in FIGS. 7(a) through 10, each unit beam panel 20 is formed to have vertically extending grooves 25 on the inner surface of the side-wall concrete panel 24, a spacer 26 comprising FRP is provided on the surface of the concrete panel 24, the first outgoing cable $21a_1$ is fitted in the first groove and the second outgoing cable $21a_2$ is fitted in the second groove. Further, the first outgoing cable $22a_1$ is fitted in the third groove and the second outgoing cable $22a_2$ is fitted in the fourth groove. Furthermore, the first outgoing cable $23a_1$ is fitted in the fifth groove and the second outgoing cable $23a_2$ is fitted in the sixth groove.

The first incoming cable $21b_1$ is placed on the first outgoing cable $21a_1$ inside the first groove, and the second incoming cable $21b_2$ is placed on the second outgoing cable $21a_2$ inside the second groove. Further, the first incoming cable $22b_1$ is placed on the first outgoing cable $22a_1$ inside the third groove, and the second incoming cable $22b_2$ is placed on the second outgoing cable $22a_2$ inside the fourth groove. Furthermore, the first incoming cable $23b_1$ is placed on the first outgoing cable $23a_1$ inside the fifth groove, and the second incoming cable $23b_2$ is placed on the second outgoing cable $23a_2$ inside the sixth groove.

Magnetic powder such as iron powder is mixed with the FRP serving as the spacer. In this case, there is an increase in the amount of flux interlinking with the windings (cables) and propulsion force can be increased in comparison with a case in which magnetic powder is not mixed with the FRP. Since the reaction force of the increased propulsion force is borne by the spacer itself, there is no increase in the force acting upon the cables, namely in the load upon the cables. Furthermore, in a case where an ordinary magnetic body such as an iron core is used, induced eddy currents are produced, magnetic drag is enlarged and the traveling resistance of the vehicle increases. In a case where magnetic powder is mixed with FRP, however, eddy currents are not produced.

In another embodiment, magnetic powder is mixed with the concrete forming the concrete panels 24 so that both the FRP spacers 26 and concrete panels contain magnetic powder to increase the magnetic flux and the propulsion force. The mixture of concrete and magnetic powder is nonconductive to avoid eddy currents in the mixture. In yet another embodiment, the concrete panels 24 contain magnetic powder but the FRP spacers 26 do not contain magnetic powder. In a still further embodiment, the concrete panels 24 contain magnetic powder and the vertical grooves 25 are formed directly in the faces of the concrete panels 24 with FRP spacers being absent.

FIG. 10 is a partial perspective view of the unit beam panel 20. Though they are not shown, three phases of the outgoing cables and incoming cables are fitted in the grooves sequentially and repeatedly.

The outgoing and incoming cables thus placed are covered by levitation-guidance coil molding bodies 27 fastened by bolts 28.

In order to fasten the outgoing and incoming cables sufficiently, an arrangement may be adopted in which a rubber member or the like is fitted between the outgoing and incoming cables and each levitation-guidance coil molding body.

Thus, according to this embodiment, identically phased coils that are turned back are fitted one above the other in two mutually adjacent grooves. In other words, according to this embodiment, the winding arrangement is such that there are four turns per phase.

Further, in accordance with the first embodiment, the cables are connected at three locations per unit beam panel. Thus, the number of connection locations can be reduced greatly.

The following is included for the sake of reference:

(1) As shown in FIG. 7(b), if we let 1.35 m be the half-cycle winding width L1 of a cable, 0.3 m the cable bending radius R and0.6 m the width L2 of the linear portion of the cable, then the half-cycle length of the cable per phase inside the unit beam panel, namely the length of cable from point A to point B, will be about 2.3 m.

(2) In a case where the length of the beam panel is 10.8 m, every phase of the three phases will have four cycles.

(3) If n represents the number of turns per phase, then the cable length is approximately 2.3×4×2×n−1.35×1+10 m per one phase.

(4) In case of eight turns, we will have 155×3=465 m if the phase of the maximum length is about 200 m and the total of the three phases is taken.

Figure 11:
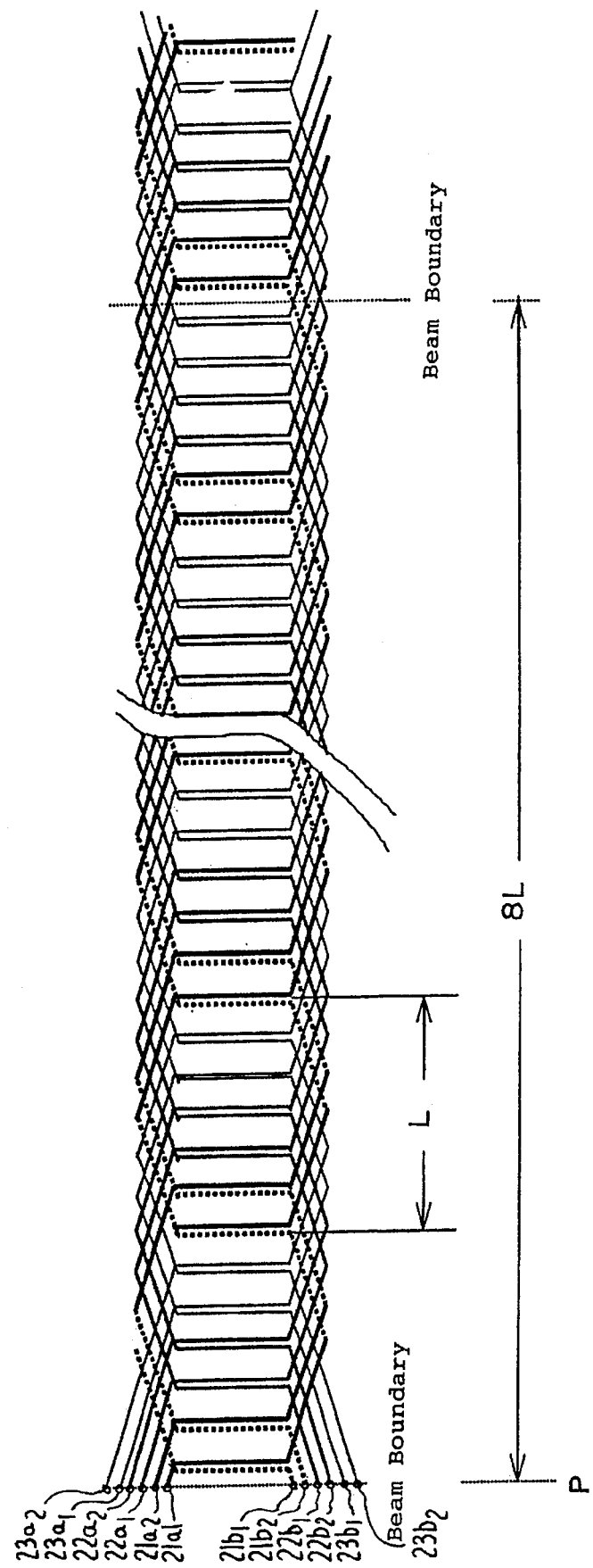
FIG. 11 is an overall structural view showing a unit beam panel of a ground-propulsion special-purpose electromagnetic circuit for a magnetically levitated railway illustrating a second embodiment of the present invention.

FIG. 11 is an overall structural view showing a unit beam panel of a ground-propulsion special-purpose electromagnetic circuit for a magnetically levitated railway illustrating a second embodiment of the present invention.

According to the first embodiment described above, it is so arranged that each cable is continuous in the overlapping loop at the boundary portion between unit beam panels. In the second embodiment, however, the cables are connected by a connector at the boundary between beam panels.

More specifically, the first outgoing cable $21a_1$, the second outgoing cable $21a_2$, the first outgoing cable $22a_1$, the second outgoing cable $22a_2$, the first outgoing cable $23a_1$, the second outgoing cable $23a_2$, the first incoming cable $21b_1$, the second incoming cable $21b_2$, the first incoming cable $22b_1$, the second incoming cable $22b_2$, the first incoming cable $23b_1$ and the first incoming cable $23b_2$ are connected at an identical location P by a connector.

Here also, the length L of a subsection is 1.35 m, and the length 8 L of the unit beam panel is 10.8 m. The unit beam panel is formed to have 48 grooves in the vertical direction and at a prescribed pitch, and plural phases of the above-mentioned cables are fitted in the grooves.

In other aspects this embodiment is similar to the first embodiment and the similarities need not be described.

In accordance with this embodiment, the fitting in of all cables is completed and then the cables are brought to the site in a state in which the guidance-levitation coil molding bodies are attached thereto. The cables are then merely connected to the cables of the adjacent beam panel.

Thus, by providing the cables at the end portion of the beam panel with a connecting portion, both end portions of the unit beam panel are merely connected by connectors, thereby making it very simple to lay the ground-propulsion special-purpose electromagnetic circuit for a magnetically levitated railway. In addition, manufacture of the unit beam panel itself is facilitated.

Further, the other end of the beam panel has cables placed in the top layer of the grooves of the adjacent beam panel.

Furthermore, the number of connection locations per beam panel differs depending upon the number of turns. There are 12 connection locations in the case of four turns.

In the case of the present system, the extension of the cables is slightly less in comparison with that of the first embodiment.

The generation of propulsion force by the ground-propulsion special-purpose electromagnetic circuit for a magnetically levitated railway according to the present invention will now be described with reference to FIGS. 5 and 12.

As shown in FIG. 5, one cell of a unit beam panel represents an electric angle of 360°. As shown in FIG. 12, a north pole and a south pole 42 of superconducting magnets correspond to one cell. As obvious from FIG. 5, the cables of the unit beam panel are such that one phase is formed by two turns. Therefore, for each of the U, V and W phases, one phase is written in abbreviated form with one line representing two turns, as illustrated in FIG. 12. Accordingly, in a case where a superconducting magnet mounted on the vehicle is located at a position where the south pole 42 is the upper pole, currents 0, $I_1$ and $I_2$ flow into a U-phase line 21', a V-phase line 22' and a W-phase line 23', respectively. According to Fieming's left-hand law applied to the south pole 42 and the current $I_1$ of the V-phase line 22' and to the south pole 42 and the current $I_2$ of the W-phase line 23', the cables are subjected to a leftward directed force so that the south pole 42 is acted upon by a rightward directed propulsion force as a reaction force. Similarly, with regard also to the north pole 43, according to Fieming's left-hand law applied to the north pole 43 and the current of the V-phase line 22' and to the north pole 43 and the current of the W-phase line 23', the cables are subjected to a leftward directed force so that the north pole 43 is acted upon by a rightward directed propulsion force as a reaction force.

Figure 12A:
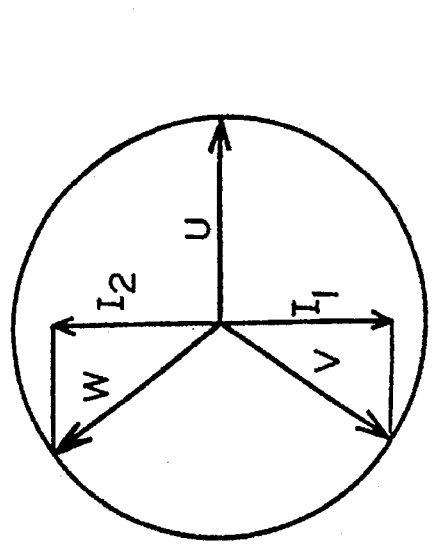
FIG. 12 is a diagram for describing the generation of a propulsion force by the ground-propulsion special-purpose electromagnetic circuit for a magnetically levitated railway according to the present invention.
Figure 12B:
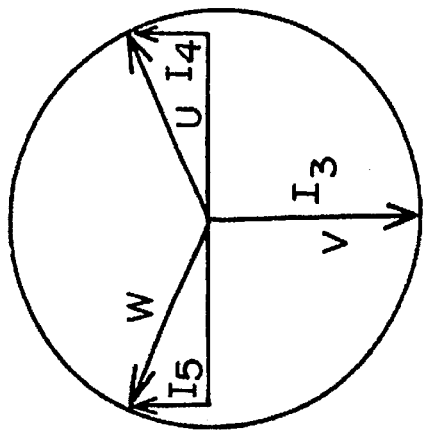
Figure 12:
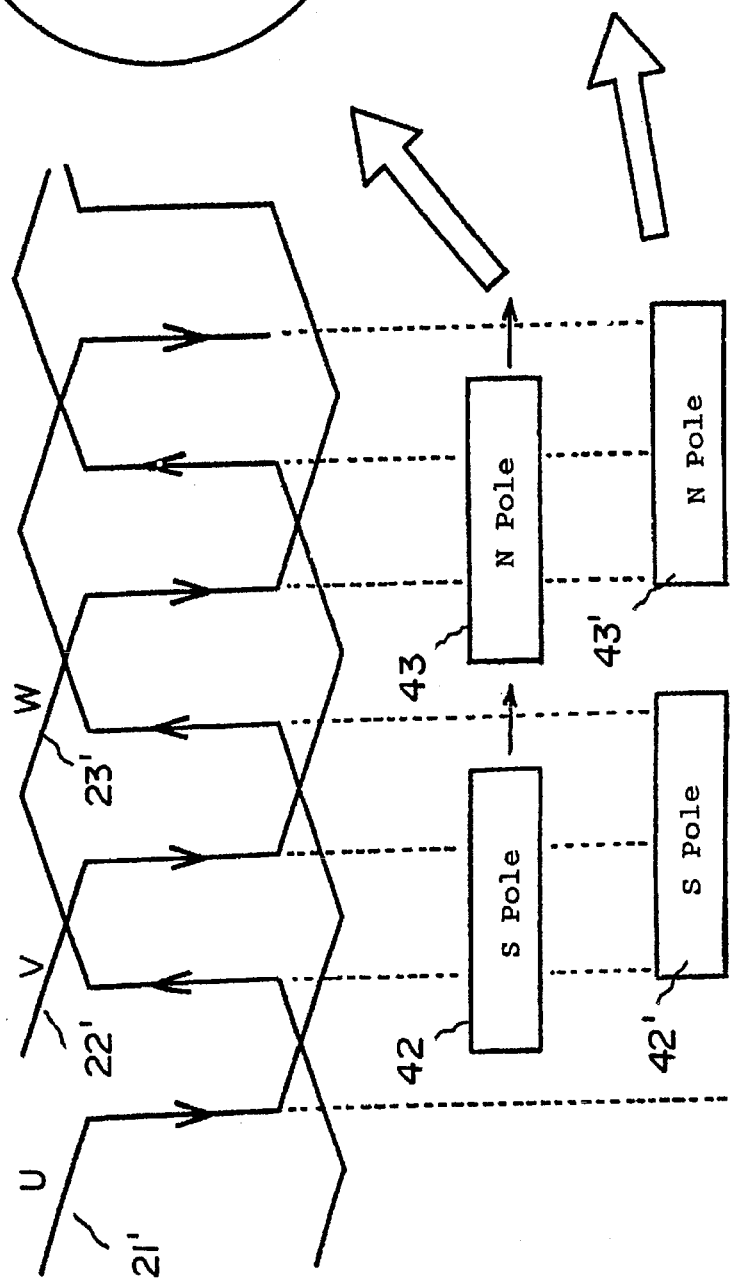

The arrows showing the currents flowing through the cables in FIG. 12 indicate the positive direction. Accordingly, in the case of the upper level, the current $I_1$ has a magnitude equal to that of the current $I_2$ and the sign thereof is negative. This means that currents of equal magnitude and direction flow in the V and W phases.

Furthermore, in a case where the superconducting magnets move as indicated by the lower level of FIG. 12, a current $I_3$ of the V-phase line 22' acts mainly upon the south pole 42' so that a propulsion force acts to move the south pole 42' to the right. It should be noted that though a current $I_4$ of the U-phase line 21' and a current $I_5$ of the W-phase line 23' are small, the south pole 42' is acted upon and propelled in a similar manner.

Further, a current $-I_3$ of the V-phase line 22' acts mainly upon the north pole 43' so that a propulsion force acts to move the north pole 43' to the right. It should be noted that though a current $-I_4$ of the U-phase 20 line 21' and a current $-I_5$ of the W-phase line 23' are small, the north pole 43' is acted upon and propelled in a similar manner.

The vehicle on which the superconducting magnets are mounted is thus acted upon by a propulsion force.

If the magnetic field produced by the superconducting magnets is 0.5 T at the cable face and the propulsion current is 1000 A, then the maximum thrust per 1 m of the vertical sides of one cable will be 0.5 kN. If the length of the vertical side of the cable is 0.6 m and the number of turns is n, then the thrust per superconducting magnet will be about $0.5 \times 0.6 \times n \times \sqrt{3}$. In case of eight turns, the thrust will be about 4.2 kN (33 kN per car of the vehicle).

With regard to laying of the cables, the beam panels fitted with the cables in advance may be mounted at the site. Alternatively, only the beam panels may be installed at the site in advance, after which the cables may be laid.

The number of turns of the cables and the manner in which they are arranged can be modified in various ways.

Thus, in accordance with the present invention, as described in detail above, a ground-propulsion special-purpose electromagnetic circuit for a magnetically levitated railway in which a vehicle is propelled by acting upon superconducting magnets mounted on the vehicle is provided with beam panels arranged on both side walls of a guideway, vertically extending grooves formed in each beam panel at a prescribed pitch, plural-phase cables fitted in the grooves, and levitation-guidance coil molding bodies covering the plural-phase cables fitted in the grooves. As a result, the following advantages are obtained:

(1) The number of lead-wire terminals of the propulsion coils can be greatly reduced, cost lowered and reliability improved.

(2) By making the cables overhang one side of the unit beam panel, care is taken so that the end portion of the unit beam panel will not have winding conditions different from those at the intermediate portion of the unit beam panel. This makes it possible to mitigate pulsation of electromagnetic force.

(3) By providing the cables at the end portion of the beam panel with a connecting portion, a ground-propulsion special-purpose electromagnetic circuit for a magnetically levitated railway can be laid in a simple manner merely by connecting both ends of the unit beam panels by connectors. In addition, manufacture of the unit beam panel itself is facilitated.

(4) It is expected that high-volume transportation in the future naturally will be accompanied by an increase in the overall length of interconnected vehicles. In such case, the number of turns of the ground propulsion coils will decline.

Thus, it is possible to provide a ground-propulsion special-purpose electromagnetic circuit for a magnetically levitated railway suited to high-volume transportation. The effects of the invention are outstanding.

As many apparently widely different embodiments of the present invention can be made without departing from the spirit and scope thereof, it is to be understood that the invention is not limited to the specific embodiments thereof except as defined in the appended claims.

What is claimed is:

1. A ground-propulsion special-purpose electromagnetic circuit for magnetically levitated railway in which a vehicle is propelled by acting upon superconducting magnets mounted on the vehicle, comprising:

beam panels placed on both side walls of a guideway;

vertically extending grooves formed in each of said beam panels at a prescribed pitch;

each of said beam panels comprising a concrete panel having a surface in which said vertically extending grooves are formed through the intermediary of a spacer comprising FRP;

said FRP being FRP containing a magnetic powder;

plural-phase cables fitted in said grooves; and a levitation-guidance coil molded body covering the plural-phase cables fitted in said grooves.

2. A ground-propulsion special-purpose electromagnetic circuit for a magnetically levitated railway in which a vehicle is propelled by acting upon superconducting magnets mounted on the vehicle, comprising:

beam panels placed on both side walls of a guideway;

vertically extending grooves formed in each of said beam panels at a prescribed pitch;

each of said beam panels comprising a concrete panel having a surface in which said vertically extending grooves are formed;

said concrete panels being concrete containing a magnetic powder;

plural-phase cables fitted in said grooves; and a levitation-guidance coil molded body covering the plural-phase cables fitted in said grooves.

3. A ground-propulsion special-purpose electromagnetic circuit for a magnetically levitated railway in which a vehicle is propelled by acting upon superconducting magnets mounted on the vehicle, comprising:

beam panels placed on both side walls of a guideway;

vertically extending grooves formed in each of said beam panels at a prescribed pitch;

each of said beam panels comprising a concrete panel having a surface in which said vertically extending grooves are formed through the intermediary of a spacer;

said concrete panel and said spacer being members containing a magnetic powder;

plural-phase cables fitted in said grooves; and a levitation-guidance coil molded body covering the plural-phase cables fitted in said grooves.

4. A ground-propulsion special-purpose electromagnetic circuit for a magnetically levitated railway in which a vehicle is propelled by acting upon superconducting magnets mounted on the vehicle, comprising:

beam panels placed on both side walls of a guideway;

vertically extending grooves formed in each of said beam panels at a prescribed pitch;

each of said beam panels comprising a concrete panel having a surface in which said vertically extending grooves are formed through the intermediary of a spacer comprising FRP;

said concrete panels being concrete containing a magnetic powder;

plural-phase cables fitted in said grooves; and a levitation-guidance coil molded body covering the plural-phase cables fitted in said grooves.

* * * * *

UNITED STATES PATENT AND TRADEMARK OFFICE
CERTIFICATE OF CORRECTION

PATENT NO. : 5,628,253
DATED : May 13, 1997
INVENTOR(S) : OZEKI et al

It is certified that error appears in the above-indentified patent and that said Letters Patent is hereby corrected as shown below:

Col. 4, line 11, "FIG. 12 is a diagram for" should read --FIGS. 12, 12(a) and 12(b) are diagrams for--

Col. 8, line 23, after "however," insert --overlapping portions of the loops of--.

Col.9, line 1, after "pole" insert --43--;

line 6, "FIG. 12" should read --FIGS. 12, 12(a) and 12(b)-- line 11, "Eieming's" should read -- Fleming's --;

line 17, "Eieming's" should read -- Fleming's --; and line 40, delete "20".

Signed and Sealed this

Eighteenth Day of August, 1998

*Attest:*

BRUCE LEHMAN

*Attesting Officer*    *Commissioner of Patents and Trademarks*